M. F. MEATH.
VEHICLE HOUNDS.
APPLICATION FILED APR. 13, 1911.
1,022,037.
Patented Apr. 2, 1912.
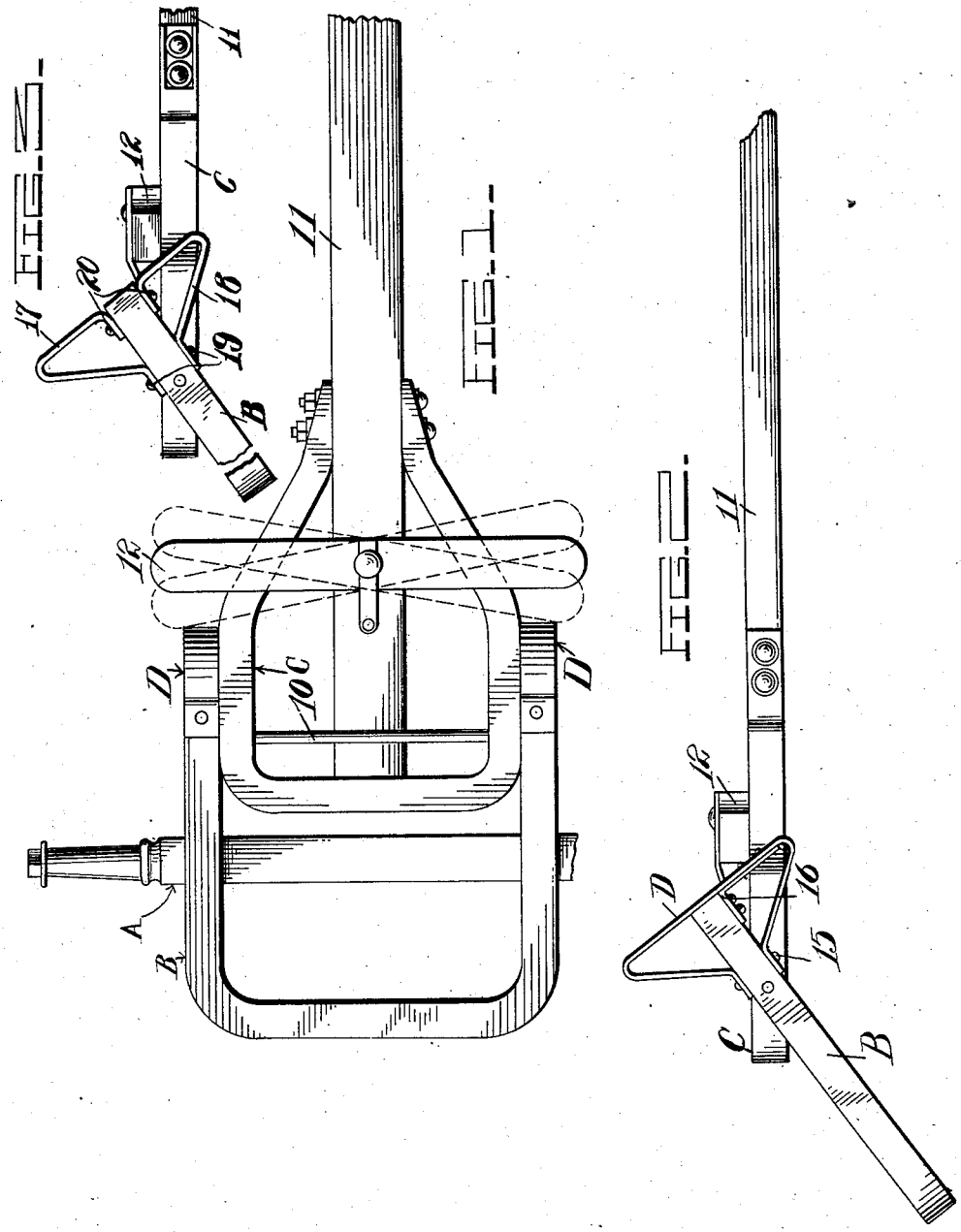
Inventor
Michael F. Meath.
Witnesses
By 
Attorneys

UNITED STATES PATENT OFFICE.

MICHAEL F. MEATH, OF SADORUS, ILLINOIS.

VEHICLE-HOUNDS.

1,022,037.  Specification of Letters Patent.  Patented Apr. 2, 1912.

Application filed April 13, 1911. Serial No. 620,823.

*To all whom it may concern:*

Be it known that I, MICHAEL F. MEATH, a citizen of the United States, residing at Sadorus, in the county of Champaign, State of Illinois, have invented certain new and useful Improvements in Vehicle-Hounds; and I do hereby declare the following to be a full, clear, and exact description of the invention, such as will enable others skilled in the art to which it appertains to make and use the same.

This invention relates to vehicle hounds.

The object of the invention resides in the provision of a vehicle hound which includes means whereby the rotation of the doubletree in either direction is limited so as to prevent same from entering the path of travel traced by the axle hounds when the body of the wagon is moved to an incline with respect to the tongue of the vehicle; such a condition arising when the vehicle is moved upon a dump incline.

With these and other objects in view the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views in which—

Figure 1 is a plan view of the front axle, hounds, tongue and double tree of a vehicle with the invention associated therewith, the double tree being shown in dotted lines at the limit of its rotation in both directions. Fig. 2 a side elevation of what is shown in Fig. 1, the axle hounds being in the position they would occupy when the body of the vehicle is disposed upon a dump incline and the double tree positioned at the limit of its rotation in one direction, and Fig. 3 a view similar to Fig. 2 showing a modified form of the invention.

Referring to the drawings, A indicates the front axle of the vehicle, B the axle hounds which are fixed to the axle and C the tongue hounds which are pivotally connected between the axle hounds B by means of the queen bolt 10, all in the usual and well known manner. The hounds C carry the tongue 11 at the rear end of which is pivotally mounted a double tree 12 for supporting the usual swingletrees. Mounted on the free ends of each of the hounds B is a stop D which is formed preferably of a metal bar having its terminals bent inwardly and disposed on opposite sides of the respective hounds B. The intermediate portion of said stop extending at right angles to the respective hounds B and in a vertical plane. The free ends of the stops D are secured to respective hounds B by means of a bolt 15 while the intermediate portion of said stop is held securely in place by means of an angle bracket 16. It will be noted that when the stops D are connected on respective hounds B, the ends of that portion of said stops which are disposed at right angles to the hounds are disposed above and below same, so that said intermediate portion will be engaged by the respective ends of the double tree 12 when said double tree is first rotated in one direction and then the other. These stops thus serve to prevent the ends of the double tree from passing inwardly of the free ends of the hounds B and thus obviate the possibility of the hounds being broken as a result of either end of the double tree 12 being disposed inwardly of the free ends of said hounds when said hounds are moved vertically to the tongue hounds.

In the form of invention illustrated in Fig. 3 the stops D are each formed of separate corresponding sections 17 and 18 positioned respectively on the upper and lower face of the hounds B. These sections 17 and 18 are substantially triangular in shape and have their sides positioned farthest front disposed in the same vertical plane at right angles to the respective hounds B. These sections 17 and 18 each have one of their sides extended rearwardly and connected together by bolts 19 passing through said sides and respective hounds B. Those sides of the sections 17 and 18 which bear against the upper and lower sides of respective hounds B throughout their entire extent are secured to said hounds by means of bolts 20. This construction of stops serves to limit the rotative movement of the double tree 12 and provide against the possibility of breaking the hounds B under the same conditions as that heretofore described with respect to the stops illustrated in Figs. 1 and 2. These stops 21 and 22 are mounted upon the upper face of the hounds C and disposed on opposite sides of the longitudinal axis of the tongue 11, and by the use of these stops 21 and 22, the rotative movement of the double tree 12 in either direction is likewise limited and the possibility of breaking the hounds B under conditions heretofore referred to also obviated.

While I have shown and described several forms of carrying my invention into practice it will be apparent that certain other variations in structure may still be resorted to without in any manner departing from the scope of the invention as set forth in the appended claim.

What is claimed is:

The combination of the axle hounds of a vehicle, tongue hounds pivotally connected to the axle hounds, a tongue supported by said tongue hounds, a double tree pivotally mounted upon said tongue and stops mounted on the forward end of each of the axle hounds for engaging the adjacent ends of the double tree to limit the movement of the latter toward the axle hounds before said double tree has entered the path of travel traversed by the axle hounds during their pivotal movement with respect to the tongue hounds.

In testimony whereof, I affix my signature, in presence of two witnesses.

MICHAEL F. MEATH.

Witnesses:
WILBUR H. ALLEN,
EDWIN B. DeLONG.

Copies of this patent may be obtained for five cents each, by addressing the "Commissioner of Patents, Washington, D. C."